(12) United States Patent
Essigmann

(10) Patent No.: US 11,871,264 B2
(45) Date of Patent: Jan. 9, 2024

(54) DETERMINING WHETHER A CELL CAN GUARANTEE AT LEAST ONE DATA TRANSMISSION PARAMETER

(71) Applicant: Telefonaktiebolaget LM Ericsson (publ), Stockholm (SE)

(72) Inventor: Kurt Essigmann, Aachen (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 128 days.

(21) Appl. No.: 17/048,718

(22) PCT Filed: May 10, 2018

(86) PCT No.: PCT/EP2018/062176
§ 371 (c)(1),
(2) Date: Oct. 19, 2020

(87) PCT Pub. No.: WO2019/214826
PCT Pub. Date: Nov. 14, 2019

(65) Prior Publication Data
US 2021/0185557 A1 Jun. 17, 2021

(51) Int. Cl.
*H04W 28/02* (2009.01)
*H04W 60/06* (2009.01)

(52) U.S. Cl.
CPC ....... *H04W 28/0273* (2013.01); *H04W 60/06* (2013.01)

(58) Field of Classification Search
CPC . H04W 28/0273; H04W 60/06; H04W 76/18; H04L 5/0064; H04L 5/0053; H04L 5/0058
See application file for complete search history.

(56) References Cited

U.S. PATENT DOCUMENTS

| | | | |
|---|---|---|---|
| 8,989,124 B1* | 3/2015 | Ramamurthy | H04W 76/12 370/329 |
| 2002/0197992 A1* | 12/2002 | Nizri | H04W 60/04 455/437 |
| 2016/0255458 A1* | 9/2016 | Huang | H04W 48/20 370/338 |
| 2016/0352645 A1 | 12/2016 | Senarath et al. | |
| 2021/0306928 A1* | 9/2021 | Ezaki | H04W 76/11 |

FOREIGN PATENT DOCUMENTS

WO 2018059963 A1 4/2018

\* cited by examiner

*Primary Examiner* — Mazda Sabouri
(74) *Attorney, Agent, or Firm* — Sage Patent Group

(57) ABSTRACT

In one example aspect, a method is provided of determining whether a cell can guarantee at least one data transmission parameter, the method comprising, in response to a notification of an attach procedure of a User Equipment (UE) to attach to a cell, determining a traffic profile for the UE, wherein the traffic profile indicates the at least one data transmission parameter for the UE, and determining whether the cell can guarantee the at least one data transmission parameter for the UE based on the traffic profile and available resources for the cell.

21 Claims, 2 Drawing Sheets

DETERMINING WHETHER A CELL CAN GUARANTEE AT LEAST ONE DATA TRANSMISSION PARAMETER

TECHNICAL FIELD

Examples of the present disclosure relate to determining whether a cell can guarantee at least one data transmission parameter.

BACKGROUND

Some cellular networks may be optimized for consumer broadband type communications where the best performance per cell and user is strived for. In some examples, the best performance refers to the highest spectral efficiency resulting in the highest throughput for typically non-critical services such as web-browsing, messaging and media streaming services. Some radio bearers may offer low latency for jitter-critical services (e.g. voice calls), but for those bearers a network cannot guarantee a level of service once a User Equipment (UE) is attached to the network. The network may reject bearer requests when all resources are allocated already, or may deliver a best effort service. Therefore, the network may behave in a non-deterministic from a user's perspective.

SUMMARY

One aspect of the present disclosure provides a method of determining whether a cell can guarantee at least one data transmission parameter. The method comprises, in response to a notification of an attach procedure of a User Equipment (UE) to attach to a cell, determining a traffic profile for the UE, wherein the traffic profile indicates the at least one data transmission parameter for the UE. The method also comprises determining whether the cell can guarantee the at least one data transmission parameter for the UE based on the traffic profile and available resources for the cell.

Another aspect of the present disclosure provides apparatus for determining whether a cell can guarantee at least one data transmission parameter. The apparatus comprises a processor and a memory. The memory contains instructions executable by the processor such that the apparatus is operable to determine, in response to a notification of an attach procedure of a User Equipment (UE) to attach to a cell, a traffic profile for the UE, wherein the traffic profile indicates the at least one data transmission parameter for the UE, and determine whether the cell can guarantee the at least one data transmission parameter for the UE based on the traffic profile and available resources for the cell.

A further aspect of the present disclosure provides apparatus for determining whether a cell can guarantee at least one data transmission parameter. The apparatus is configured to determine, in response to a notification of an attach procedure of a User Equipment (UE) to attach to a cell, a traffic profile for the UE, wherein the traffic profile indicates the at least one data transmission parameter for the UE, determine whether the cell can guarantee the at least one data transmission parameter for the UE based on the traffic profile and available resources for the cell.

A still further aspect of the present disclosure provides apparatus for determining whether a cell can guarantee at least one data transmission parameter. The apparatus comprises a first determining module configured to determine, in response to a notification of an attach of a User Equipment (UE) to attach to a cell, determining a traffic profile for the UE, wherein the traffic profile indicates the at least one data transmission parameter for the UE. The apparatus further comprises a second determining module configured to determine whether the cell can guarantee the at least one data transmission parameter for the UE based on the traffic profile and available resources for the cell.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

In some embodiments, once a UE is attached to a cell (e.g. a cell in a cellular communications network), such as for example following a successful attach procedure or a handoff from another cell, a traffic profile is determined for the UE. The traffic profile may indicate at least one data transmission parameter for the UE. That is, for example, the data transmission parameter may indicate a latency, throughput or any other parameter that is required by the UE for data transmissions (including voice data transmissions) to and/or from the UE. In some embodiments, if the cell cannot guarantee the requirements of the UE as specified in the traffic profile, the UE may not remain attached or camped on the cell. For example, the network or the cell may instruct the UE to detach from the cell. The UE may then in some embodiments attempt to attach to a different cell, if available.

Figure 1:
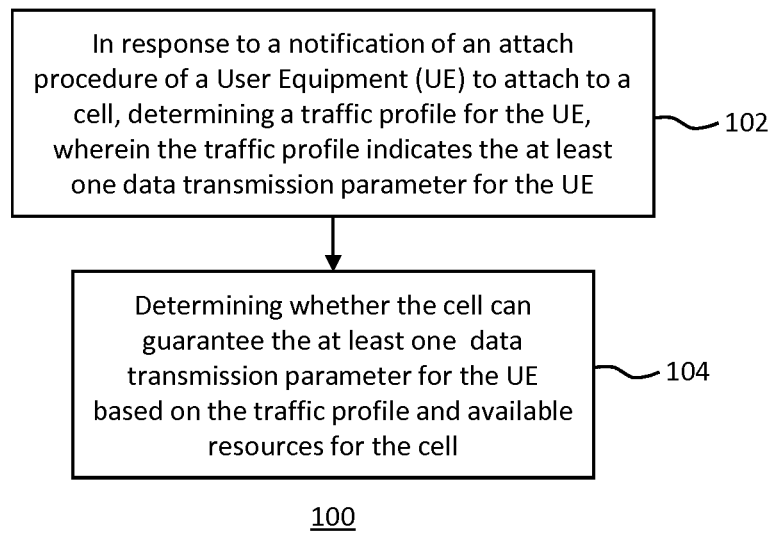
FIG. 1 is a flow chart of an example of a method 100 of determining whether a cell can guarantee at least one data transmission parameter.

FIG. 1 is a flow chart of an example of a method 100 of determining whether a cell can guarantee at least one data transmission parameter, e.g. for a UE that has attached to the cell, or will become attached to the cell. In some embodiments, the method may be implemented in one or more network nodes.

The method comprises, in step 102, in response to a notification of an attach procedure of a User Equipment (UE) to attach to a cell, determining a traffic profile for the UE, wherein the traffic profile indicates the at least one data transmission parameter for the UE. In some embodiments, the request may be received from a network control node, e.g. that determines that a UE has newly attached to a cell. In some embodiments, determining the traffic profile may comprise requesting the traffic profile from a network node or traffic profile repository, such as for example a Device Traffic Profile Manager (DTPM). The request may identify the UE. The traffic profile, or an indication of the traffic profile, may be provided in response.

The method 100 also comprises, in step 104, determining whether the cell can guarantee the at least one data transmission parameter for the UE based on the traffic profile and available resources for the cell. In some embodiments, for example, the resources of the cell may be compared with the amount of resources that have already been allocated or guaranteed for other UEs or devices. If the difference (e.g. the amount of available resources) is sufficient to guarantee the resources specified in the traffic profile for the UE, then the UE may be allowed to remain attached to or camped on the cell. On the other hand, if the resources cannot be guaranteed, the UE may not be allowed to remain attached to or camped on the cell. In some embodiments, a cell guaranteeing a resource for the UE means that the resource is always available, even if the UE is not always using the resource. For example, where the resource is a maximum latency, the cell may guarantee that communications to and/or from the UE will always have a latency at or below the maximum latency.

In some examples, determining whether the cell can guarantee the at least one data transmission parameter for the UE based on resource capabilities for the cell and a traffic profile for at least one other device attached to the cell. That is, for example, determining whether the cell can guarantee the at least one data transmission parameter comprises determining whether the cell can guarantee the at least one data transmission parameter for the UE based on resource capabilities for the cell and a traffic profile for at least one other device attached to the cell. For example, the resource capabilities for the cell may be the maximum available resource for that cell, e.g. a maximum bandwidth available, or may be another indication of the cell's capabilities. The traffic profile for at least one other device (e.g. one or more other UEs) attached to the cell may along with the resource capabilities indicate how much of the resource is remaining to be allocated (e.g. guaranteed) for another UE. The at least one other device may for example be at least one other device attached to the cell and associated with a respective traffic profile. In some embodiments, the at least one other device comprises all devices attached to the cell and associated with respective traffic profiles. In some examples, the method 100 comprises determining the resource capabilities of the cell by determining a number of UEs with the traffic profile that the cell can support. For example, the number of UEs may be the potential number of UEs that can be supported by the cell (e.g. their traffic profiles can be guaranteed) that share a particular traffic profile, or that have similar data transmission parameters.

In some embodiments, the method 100 comprises causing the UE to detach from the cell in response to determining that the cell cannot guarantee the at least one data transmission parameter for the UE. The UE is then no longer camping on the cell and cannot use the cell's resources. The UE may for example attempt to attach to a different cell, if available. In some embodiments, causing the UE to detach from the cell comprises sending an instruction to the UE to detach from the cell.

If the cell can guarantee the data transmission parameter(s) of the UE's traffic profile, the method 100 may in some embodiments comprise allowing the UE to remain attached to the cell in response to determining that the cell can guarantee the at least one data transmission parameter for the UE. The UE may then use the cell's resources, e.g. may transmit and/or receive data, and the traffic parameter(s), such as for example latency, bandwidth, and/or other parameters, can be guaranteed by the cell.

In some embodiments, the notification of the attach procedure comprises a notification of a requested, ongoing or completed attach procedure for the UE to attach to the cell. The notification may be received or example from a network control node.

In some embodiments, if the cell cannot guarantee the traffic profile (data transmission parameter(s)) for a UE, the UE may be requested to use a second traffic profile as an alternative, whereby the second traffic profile may have lower requirements than the first traffic profile. For example, the second traffic profile may have at least one more relaxed data transmission requirement, such as for example a lower bandwidth or higher latency guarantee. The method 100 may therefore in some examples comprise determining a second traffic profile for the UE, wherein the second traffic profile indicates at least one second data transmission parameter for the UE, and determining whether the cell can guarantee the at least one data transmission parameter for the UE based on the second traffic profile and available resources for the cell. In some examples, before requesting the UE to use the second traffic profile, it may be determined whether the cell can meet the requirements of the second traffic profile for the UE. As a result, in some embodiments, the method 100 may comprise causing the UE to detach from the cell in response to determining that the cell cannot guarantee the at least one second data transmission parameter for the UE, and allowing the UE to remain attached to the cell in response to determining that the cell can guarantee the at least one data transmission parameter for the UE.

In some embodiments, if a cell is loaded (e.g. the usage or guarantee of resources is above a threshold level), the cell may automatically request that a newly attached UE use a second traffic profile associated with the UE, the second traffic profile having lower requirements (e.g. one or more relaxed data transmission parameters). Additionally or alternatively, in some embodiments, if the loading of the cell has exceeded the threshold, one or more UEs already attached to the cell may be requested to use a second, more relaxed traffic profile. For example, the method 100 may comprise, in response to usage of resources of the cell exceeding a threshold, sending a request to one or more UEs attached to the cell to use a second traffic profile associated with each respective UE, wherein the second traffic profile indicates at least one second data transmission parameter for the UE.

In some embodiments, determining the traffic profile for the UE comprises receiving an identification of the UE, and retrieving the traffic profile from storage based on the identification. Therefore, for example, the traffic profile may be stored locally at the entity implementing the method 100.

In some embodiments, the at least one data transmission parameter comprises at least one of a maximum average latency for data transmissions, a maximum latency for data transmissions, a maximum packet loss for data transmissions, a minimum data rate for data transmissions, a minimum average data rate for data transmissions, and/or any other parameter for data transmissions (including voice data transmissions) to and/or from the UE.

Exemplary embodiments will now be described below.

A network node, e.g. logical IoT (Internet of Things) entity, Device Traffic Profile Manager (DTPM) may store respective Traffic Profiles that are assigned to UEs. These traffic profiles can be assigned to respective UEs before they are onboarded to the IoT system and before network (NW) attach via manual configuration management processes that specify the traffic profiles.

The parameters of the Traffic Profiles may specify one or more of:

Latency average, e.g. in ms
Latency upper bound, e.g. in ms (i.e. the max allowed latency)
Cycle time, e.g. in ms (i.e. the cyclic period in which the UE sends/receives data)
Data-volume per time interval per cycle, e.g. in byte/s
Max packet loss ratio, e.g. in %
Data rate average, e.g. in bits/s (this parameter may be mutually exclusive to the availability of the first three parameters)

In some examples, a respective second Traffic Profile (with more relaxed parameters) can be assigned to one or more UEs with values for the above parameters that are less capacity demanding. Whether or not such a second Traffic Profile can be assigned (e.g. agreed by the UE) may depend on the application of the UE in question.

The DTPM may have one or more of the following functions:
1) It informs a Network Admittance Controller (NAC) entity when a new UE is onboarded onto the IoT system including the Traffic Profile of the UE;
2) It replies to the NAC when the NAC requests or renegotiates the Traffic Profile;
3) It explicitly offboards a UE when no capacity is available in a cell, e.g. the requirements of the UE's traffic profile cannot be guaranteed by the cell; and
4) Inform the System Operator that a certain UE is not receiving service from the NW and is offboarded.

A new logical network function Network Admittance Controller (NAC) is introduced. The NAC may have one or more of the following functions:
1) It stores or has access to a list of cells/sectors where the procedure of determining whether a cell can guarantee at least one data transmission parameter can be applied. In some examples, implicitly all other cells of the Public Mobile Network (PMN) or slice of the PMN are excluded from the area where such guarantees can be applied.
2) It stores or has access to a resource model per each cell/sector. The resource model may be determined for example by the available bandwidth of the cell (or of the NW slice), the geographical coverage of the cell, and/or the measured cell performance at the cell boundaries.
3) It contains a list of all UEs that are already admitted to a certain cell in which guarantees can be applied (e.g. the cell may be able to guarantee at least one data transmission parameter).
4) It calculates for each new UE that requests admittance to a cell whether or not the UE may be admitted. For example, the available resources for the cell may be compared to the requirements of the UE's traffic profile.
5) In case the requirements of the UE's traffic profile cannot be guaranteed (given the constraints of the cell capacity), it may negotiate with the DTPM node whether or not a second (e.g. more relaxed) traffic profile can be applied for the UE.
6) It receives notifications from the NW when a UE has moved to another cell or was admitted to the NW on a certain cell.
7) It requests explicit detach of a UE.

Figure 2:
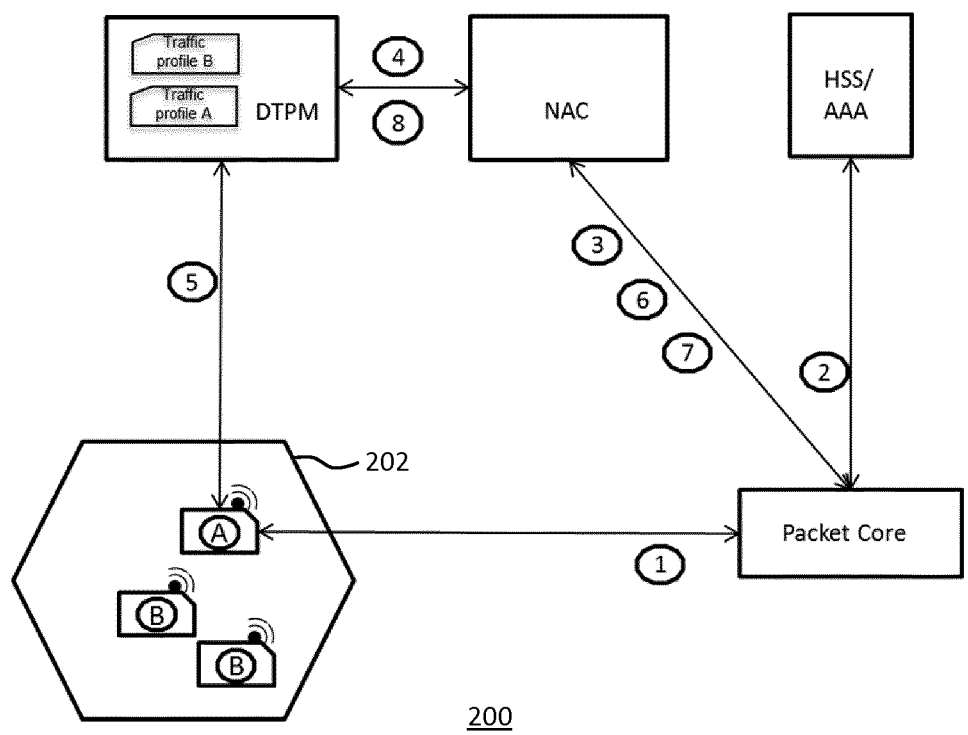
FIG. 2 is a schematic of an example of a communication system.

FIG. 2 is a schematic of an example of a communication system 200, e.g. part of a network, that illustrates an example procedure as defined in the following steps. FIG. 2 includes each step number between the entities that may communicate during the respective step.
1) A UE requests admittance to the NW, e.g. using standard 3gpp methods.
2) The NW authenticates the UE, e.g. using standard 3gpp methods.
3) The NW notifies the NAC entity via a new interface that a UE is camping on a specific cell 202 (e.g. specifying IMSI and/or Cell-ID)
4) The NAC requests the Traffic Profile associated with the UE from the DTPM entity and informs the DTPM entity whether or not that UE with that profile may be admitted to the network, e.g. based on available cell resources/capacity.
5) The UE requests onboarding to the IoT system, and the DTPM accepts or rejects onboarding depending on the NAC's decision.
6) The NW sends a notification to the NAC that a new UE is now camping on the same cell 202 (e.g. due to a cell handover). The NAC may in response indicate to the DTPM that a certain UE may not any longer camp on that cell—the DTPM may offboard the certain UE or may allow for traffic profile renegotiation. For example, one UE may be offboarded in favour of a higher priority UE if the traffic profile requirements of the higher profile UE cannot otherwise be guaranteed by the cell, or the lower priority UE may be requested to use a second, more relaxed traffic profile.
7) The NAC explicitly requests detach from the NW when a UE cannot receive service any longer from the cell 202 due to capacity constraints—For example, the cell 202 can no longer guarantee the parameters in the UE's traffic profile.
8) The DTPM notifies the NAC that a certain UE is offboarded and no longer consumes NW services.

One or more embodiments described herein may allow a NW operator to guarantee data transmission parameters (e.g. traffic profiles or Service Level Agreements, SLAs) to users (e.g. industrial users) who require a deterministic communications behaviour. Applications such as for example industrial applications may use the cellular network infrastructure for critical communication channels instead of building specialized NWs for such purposes or using wired communication technologies instead. In some embodiments, a NW operator can define certain geographical areas which may be determined by the radio propagation range of one or more cells/sectors, and only in these areas a guarantee can be applied while the other cells/sectors of a network may conform to for example a consumer mobile broadband (MBB) model. The NW operator can also in some embodiments define a NW slice for which traffic profiles (e.g. data transmission parameter or SLA guarantees) can be applied, while other slice(s) may conform to a consumer MBB model (e.g. one where traffic profiles may not be guaranteed). In some examples, a UE and/or an application on a UE may know at the time of attach or at cell change (e.g. handover) whether or not its traffic profile can be guaranteed or not.

In some examples, to achieve a deterministic behaviour, the NW operator may:
1) Have a Radio Capacity Model of all radio cells/sectors in which a data transmission parameter (e.g. traffic profile or SLA) is to be guaranteed, the Radio Capacity Model in some embodiments indicating the capacity and/or one or more available or total resources of the cells/sectors;
2) Have a respective traffic model associated with all UEs that require a guaranteed data transmission parameter;
3) Reject admittance requests from any newly attached UEs for which no traffic profile (e.g. data transmission parameter or SLA) can be guaranteed by the cell to which it is attached or on which it is camping; and/or
4) Attempt to negotiate the traffic profile (e.g. data transmission parameter or SLA) upon an admittance request from an UE in case the requested traffic profile cannot be guaranteed by that cell/sector in question. For example, the NW operator may request that the UE use a second, more related traffic profile.

Figure 3:
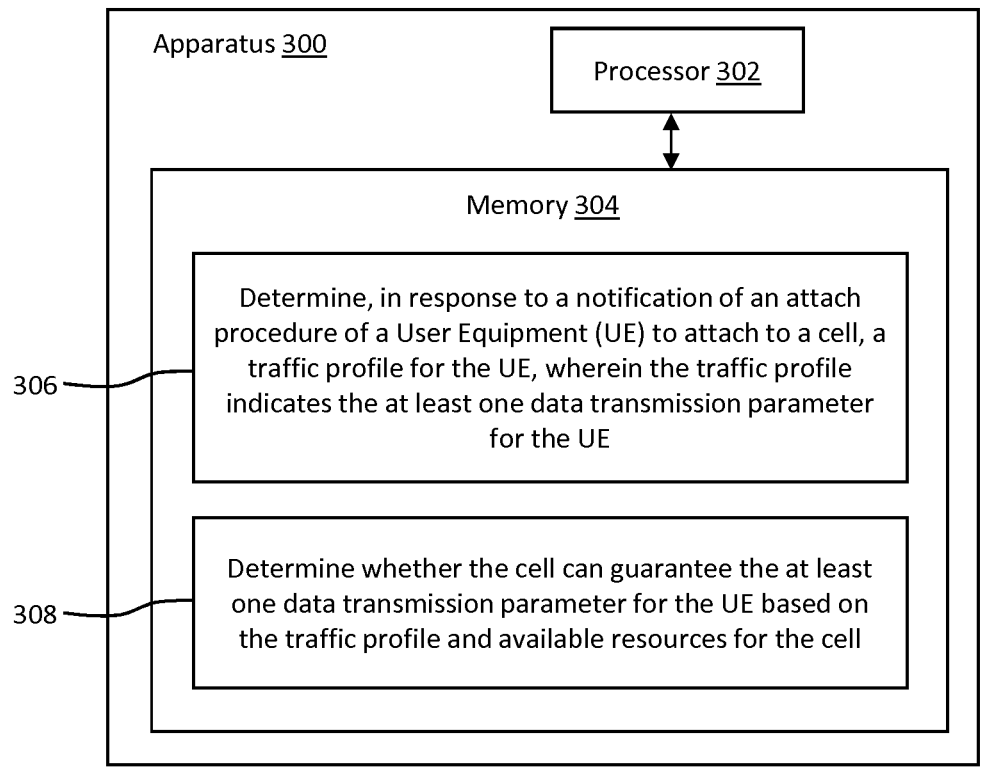
FIG. 3 is a schematic of an example of an apparatus for determining whether a cell can guarantee at least one data transmission parameter.

FIG. 3 shows an example of an apparatus 300 according to an embodiment of this disclosure. For example, the apparatus 300 may be apparatus for determining whether a cell can guarantee at least one data transmission parameter. The apparatus 300 may be configured to perform the method of FIG. 1 or any other example.

The apparatus 300 comprises processing circuitry 302 (e.g. a processor) and memory 304 in communication with the processing circuitry 302. The memory 304 contains instructions executable by the processing circuitry 302. In one embodiment, the memory 304 contains instructions 306 executable by the processing circuitry 302 such that the apparatus is operable to determine, in response to a notification of an attach procedure of a User Equipment (UE) to attach to a cell, a traffic profile for the UE, wherein the traffic profile indicates the at least one data transmission parameter for the UE. The memory 304 may also contain instructions 308 executable by the processing circuitry 302 such that the apparatus is operable to determine whether the cell can guarantee the at least one data transmission parameter for the UE based on the traffic profile and available resources for the cell.

Figure 4:
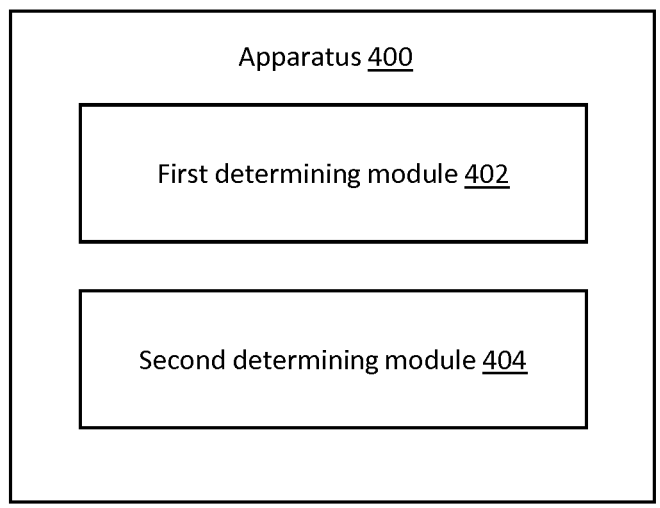
FIG. 4 is a schematic of an example of apparatus for determining whether a cell can guarantee at least one data transmission parameter.

FIG. 4 is a schematic of an example of apparatus 400, for example apparatus for determining whether a cell can guarantee at least one data transmission parameter. The apparatus 400 comprises a first determining module 402 configured to determine, in response to a notification of an attach of a User Equipment (UE) to attach to a cell, determining a traffic profile for the UE, wherein the traffic profile indicates the at least one data transmission parameter for the UE. The apparatus also comprises a second determining module 404 configured to determine whether the cell can guarantee the at least one data transmission parameter for the UE based on the traffic profile and available resources for the cell.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of determining whether a cell can guarantee at least one data transmission parameter, the method comprising:
   determining, in response to a notification of an attach procedure of a User Equipment (UE) to attach to a cell, a first traffic profile for the UE, wherein the first traffic profile indicates the at least one data transmission parameter for data transmission to and/or from the UE; and
   determining whether the cell can guarantee the at least one data transmission parameter for the UE, while allowing the UE to remain attached to or camped on the cell, based on at least one traffic profile of at least one other UE attached to the cell, the first traffic profile and available resources for the cell,
   wherein the at least one data transmission parameter comprises at least one of:
   a maximum average latency for data transmissions;
   a maximum latency for data transmissions; and
   a maximum packet loss for data transmissions.

2. The method of claim 1, further comprising receiving the notification of the attach procedure from a network control node.

3. The method of claim 1, further comprising, in response to determining that the cell cannot guarantee the at least one data transmission parameter for the UE:
   determining a second traffic profile for the UE, wherein the second traffic profile indicates at least one second data transmission parameter for the UE; and
   determining whether the cell can guarantee the at least one data transmission parameter for the UE based on the second traffic profile and available resources for the cell.

4. The method of claim 3, wherein the determining whether the cell can guarantee the at least one data transmission parameter for the UE is based on resource capabilities for the cell and a traffic profile for at least one other device attached to the cell.

5. The method of claim 4, wherein the at least one other device is associated with a respective traffic profile.

6. The method of claim 5, wherein the at least one other device comprises all other devices attached to the cell and associated with respective traffic profiles.

7. The method of claim 4, further comprising determining the resource capabilities of the cell by determining a number of UEs with the traffic profile that the cell can support.

8. The method of claim 3, further comprising causing the UE to detach from the cell in response to determining that the cell cannot guarantee the at least one data transmission parameter for the UE based on the second traffic profile and available resources for the cell.

9. The method of claim 3, further comprising allowing the UE to remain attached to the cell in response to determining that the cell can guarantee the at least one data transmission parameter for the UE based on the second traffic profile and available resources for the cell.

10. The method of claim 3, further comprising:
causing the UE to detach from the cell in response to determining that the cell cannot guarantee the at least one second data transmission parameter for the UE; and
allowing the UE to remain attached to the cell in response to determining that the cell can guarantee the at least one data transmission parameter for the UE.

11. The method of claim 3, further comprising causing a request to be sent to the UE for the UE to use the second traffic profile.

12. The method of claim 11, further comprising causing the UE to detach from the cell in response to an indication that the UE cannot use the second traffic profile.

13. The method of claim 3, wherein the at least one second traffic parameter comprises a lower resource requirement than the at least one traffic parameter.

14. The method of claim 3, wherein the determining the first traffic profile for the UE comprises:
sending a request to a traffic profile repository, wherein the request identifies the UE; and
receiving an indication of the first traffic profile for the UE in response to the request.

15. The method of claim 3, wherein the determining the first traffic profile for the UE comprises:
receiving an identification of the UE; and
retrieving the first traffic profile from storage based on the identification.

16. The method of claim 3, further comprising sending, in response to usage of resources of the cell exceeding a threshold, a request to one or more UEs attached to the cell to use another traffic profile associated with each respective UE; wherein the another traffic profile indicates at least one second data transmission parameter for the corresponding UE.

17. A non-transitory computer readable recording medium storing a computer program product for controlling an apparatus for determining whether a cell can guarantee at least one data transmission parameter, the computer program product comprising program instructions which, when run on processing circuitry of the apparatus, causes the apparatus to:
determine, in response to a notification of an attach procedure of a User Equipment (UE) to attach to a cell, a traffic profile for the UE, wherein the traffic profile indicates the at least one data transmission parameter for data transmissions to and/or from the UE; and
determine whether the cell can guarantee the at least one data transmission parameter for the UE, while allowing the UE to remain attached to or camped on the cell, based on at least one traffic profile of at least one other UE attached to the cell, the traffic profile and available resources for the cell, wherein the at least one data transmission parameter comprises at least one of:
a maximum average latency for data transmissions;
a maximum latency for data transmissions; and/or
a maximum packet loss for data transmissions.

18. An apparatus for determining whether a cell can guarantee at least one data transmission parameter, the apparatus comprising:
processing circuitry; and
memory containing instructions executable by the processing circuitry whereby the apparatus is operative to:
determine, in response to a notification of an attach procedure of a User Equipment (UE) to attach to a cell, a traffic profile for the UE, wherein the traffic profile indicates the at least one data transmission parameter for data transmissions to and/or from the UE; and
determine whether the cell can guarantee the at least one data transmission parameter for the UE, while allowing the UE to remain attached to or camped on the cell, based on at least one traffic profile of at least one other UE attached to the cell, the traffic profile and available resources for the cell, wherein the at least one data transmission parameter comprises at least one of:
a maximum average latency for data transmissions;
a maximum latency for data transmissions; and
a maximum packet loss for data transmissions.

19. The method of claim 1, wherein the at least one data transmission parameter comprises at least one of:
a maximum average latency for data transmissions; and
a maximum packet loss for data transmissions.

20. The non-transitory computer of claim 17, wherein determining whether the cell can guarantee the at least one data transmission parameter for the UE comprises determining whether the cell can guarantee the at least one data transmission parameter separately from a length of a single data transmission.

21. The apparatus of claim 18, wherein determining whether the cell can guarantee the at least one data transmission parameter for the UE comprises determining whether the cell can guarantee the at least one data transmission parameter for the UE for at least the duration of more than one communication session.

* * * * *